United States Patent Office 2,811,629
Patented Oct. 29, 1957

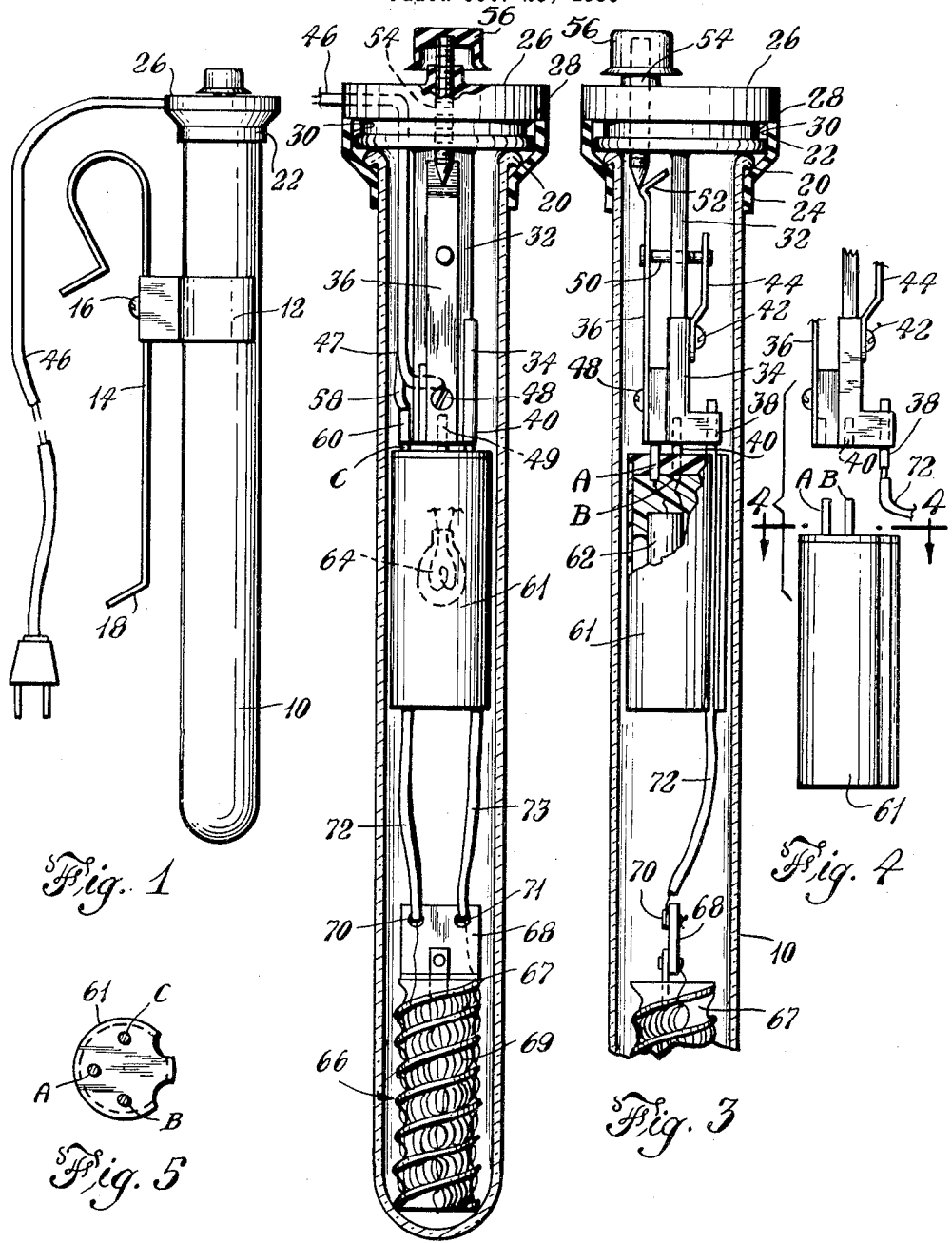

2,811,629

AQUARIUM HEATING AND INDICATING DEVICE

Eugene G. Danner, Brooklyn, N. Y.

Application October 23, 1956, Serial No. 617,736

4 Claims. (Cl. 219—41)

This invention appertains to aquarium heating and indicating means and is an improvement over the Aquarium Heater disclosed in my prior Patent No. 2,477,363 issued July 26, 1949.

Immersion type heaters of prior art designs normally comprise elongated envelopes of heat resistant glass into which fit the elements used for heating. An insulating cap of the screw type conventionally is used to render the assembly substantially water-proof. Caps of this type, however, are not of drip-proof construction, and the high humidity found around aquariums causes many heaters to fail.

Prior art immersion heaters often fail after replacement of parts because they do not have plug type foolproof connections.

The main object of this invention then is to provide aquarium heating and indicating means which are free of the above-indicated failings of prior art devices.

An important object of this invention is to provide airtight, water-tight snap-on caps for such heaters.

A further object of this invention is to provide in an aquarium heater, a cartridge container of translucent material for indicating and condenser means.

It is a further object of this invention to make a combined electric aquarium heater and heating indicator which is easily serviced without the possibility of erroneously connecting replacement parts and also which is compact, shockproof, waterproof and durable.

Other objects and advantages of the invention will become obvious as the description thereof proceeds.

To facilitate understanding of this invention for ready appreciation of the salient features thereof, the same is illustrated on the accompanying drawing forming a part hereof, and in which:

Figure 1 is a side elevation of the device of the invention with means for attaching the same to an aquarium in place thereon.

Figure 2 is a front elevation of the device of the invention, partially broken away to show details thereof.

Figure 3 is a side elevation view taken of the device as shown in Figure 2.

Figure 4 is a side elevational view showing the attachment of the cartridge assembly with the upper assembly of the device.

Figure 5 is a top plan view taken along line 4—4 of Figure 4.

Throughout these views, the same reference numerals indicate the same parts.

The working elements of the device are contained in a glass tube 10, preferably constructed of heat-resistant glass like Pyrex. A clamp 12 is provided at the upper end of the tube. A supporting bracket 14 adapted to be looped over the wall of an aquarium or other container, is attached to the clamp by bolt 16. The depending portion of bracket 14 integral therewith is spaced from the inside of the aquarium by a bottom foot extension 18.

The upper end of tube 10 terminates in a flange 20, beneath which is located a ring 22 having an inwardly directed retaining flange 24 at the bottom for engaging below flange 20. Ring 22 is made of insulating material such as heat-resistant rubber, or similarly suitable plastic such as polyethylene and the like. Cooperating therewith in snap-on engagement therein is a cap 26 of similar material having an annularly recessed bottom part 28 engaging with a complementary annular projection on said ring 22 such as 30, thereby to fix the cap on the tube as a waterproof, air-tight closure therefor.

Cap 26 supports a depending strip of insulating material 32 on which are mounted two metal strips 34 and 36. Strip 34 terminates in two contact lugs 38 and 40. A screw 42 secures to the top of strip 34 a contactor 44. A double conductor cable exteriorly of the tube 46 enters the tube through an aperture in cap 26. Element 47 in cable 46 connects with metal strip 36 below the cap by means of screw 48 which also secures the strip to insulating member 32, which has a recess at the bottom thereof which in conjunction with strip 36 forms a prong-engaging lug 49, directly below screw 48. Strip 36 at its upper end forms a spring contact and has a projecting contact point 50 extending through an aperture in insulating member 32 toward strip 44. The upper end of strip 36 is inclined at 52. A downwardly inclined regulating screw 54 screwed through cap 26 extends into physical contact with the inclined upper end of strip 36.

Screw 54 has a knob 56 above the cap by which to manipulate it and turn it down until it causes contact between contact point 50 and contactor 44.

Element 58 in cable 46 terminates in a metal plate 60 having two prong-engaging lugs, the function of which will be described later.

A sealed cartridge element 61 is provided intermediate tube 10. The cartridge is made of translucent plastic material such as styrene or other material able to diffuse light. The cartridge has a twin-recessed configuration as shown in Figure 5 for a purpose later to be described. Three projecting lugs issue from the top of the cartridge for engagement with complementary sockets in the part above it. Within the cartridge is positioned a condenser 62 in contact with prongs A and B which fit respectively into sockets 49 and 40. Connected in series with the condenser is a socket (not shown) bearing a small light bulb 64, the light bulb being in contact with prongs B and C; the latter fitting in one of the lugs of plate 60. A resistor is placed in series between C and the socket. The pilot light 64 indicates when the heater is furnishing heat.

A heater coil 66 is connected in parallel with the bulb. This heater consists of a refractory coil form 67, attached to insulating material 68 and has a heater coil 69 wound thereon with the ends of the coil attached to a pair of terminals 70, 71 on 68. Two leads 72, 73, fitting intermediate the cartridge and the walls of the tube in the recesses molded into the cartridge as indicated before. Lead 72 terminates in a prong fitting in lug 38, while lead 73 has a prong fitting in a lug of plate 60.

In operation, the amount of current reaching the heating coil is regulated by contact between screw 54 and strip 36. The more the screw extends into the tube, the greater the contact between contact point 50 and contactor 44 and the more current passes through. The condenser serves for conventional purposes and to avoid sudden current surges.

With the device of the invention it is possible to have compactness, water-tightness and fool-proof change of parts without in any way complicating the design of the container envelop or of the cap.

The improved snap-on cap construction of the invention permits safer removal therefrom than is possible with screw-on type caps, which also require more stress to be applied to the tube for removal. The snap-on cap herein disclosed may easily be removed by simply inserting a blade between the top of ring 22 and it.

With the disclosed configuration of the cartridge prongs, it is impossible to make wrong connections when replacing parts.

Suitably strip 44 may be made of a bimetallic composite so as to act as a thermostat. In this manner dependent upon the different coefficient of expansion of the metals used, contact will occur to automatically turn up heat.

While I have, in the above description, taught what I believe to be practical and efficient embodiments of the present invention, it should be well understood that I do not wish to be limited thereto, as there might be changes made in the arrangement, disposition and form of the parts without departing from the principle of my invention as comprehended within the scope of the appended claims.

Having thus described my invention what I claim is new and desire to be secured by Letters Patent of the United States is:

1. A combined aquarium heating and indicating device comprising an elongated heat resistant glass envelop having a closed end and a flanged upper end, a ring of insulating material having an inwardly directed retaining flange engaging said envelop immediately below its flange, the upper part of said ring having an annular projection, a cap closing the upper end of said envelop and having a complementarily annular recess at the bottom thereof for snap-on engagement with said annular projection of said ring; an insulating member in said envelop below said cap bearing a pair of metallic side strips; a pair of current-carrying conductors passing through said cap into envelop; a cartridge of translucent material positioned below said insulating member, said cartridge having twin-recesses extending the length thereof, said cartridge containing a condenser and a light-bulb socket in series therewith, a heater coil disposed within the lower end of said envelop having the two ends thereof connected to said side strips by leads fitting in the recesses of said cartridge, and means for regulating the amount of current reaching said side strips.

2. A combined aquarium heating and heat indicating device comprising a tube closed at the bottom and open at the top, supporting means by which said tube is suspended from its top, cover means for hermetically closing said tube, electric heating means in said tube; vertically disposed elongated insulating base depending from said cover means, a pair of side strips of metal on said base, the first of said strips having an inclined upper end forming a spring contact, the second of said strips having two contact lugs at the bottom thereof and a contactor at the top thereof, means for making electric contact between said strips; two current-carrying conductors passing through said cover means into said tube, one of said conductors being in electrical connection with said first strip, the other conductor terminating in a metal plate having two sockets thereon; a sealed cartridge element composed of translucent plastic having a top provided with three prongs, said element having therein a condenser in contact with two of said prongs, one of said prongs fitting in a lug of said second strip of said base, the other prong in contact with said first strip; a light bulb-bearing socket in series with said condenser and also with said metal plate, and a heater coil at the bottom of said tube, the ends of said coil being in contact with said metal strips on said insulating base.

3. The combination of claim 1 wherein said glass envelop is sealed.

4. The device of claim 1 wherein said means for regulating the amount of current reaching said side strips consist of a bimetallic thermostatic composite.

References Cited in the file of this patent

UNITED STATES PATENTS

| | | |
|---|---|---|
| 2,477,363 | Danner | July 26, 1949 |
| 2,666,838 | Krah et al. | Jan. 19, 1954 |
| 2,699,488 | Arak et al. | Jan. 11, 1955 |